United States Patent
Xing et al.

(10) Patent No.: US 12,503,599 B2
(45) Date of Patent: Dec. 23, 2025

(54) THERMAL CONDUCTIVE SILICONE COMPOSITION

(71) Applicant: DOW SILICONES CORPORATION, Midland, MI (US)

(72) Inventors: Chong Xing, Shanghai (CN); Dorab Edul Bhagwagar, Auburn, MI (US); Qiang Huang, Shanghai (CN); Lu Zou, Shanghai (CN); Rui Yang, Shanghai (CN); Junmin Zhu, Shanghai (CN)

(73) Assignee: Dow Silicones Corporation, Midland, MI (US)

(*) Notice: Subject to any disclaimer, the term of this patent is extended or adjusted under 35 U.S.C. 154(b) by 490 days.

(21) Appl. No.: 17/911,622

(22) PCT Filed: Mar. 16, 2020

(86) PCT No.: PCT/CN2020/079448
§ 371 (c)(1),
(2) Date: Sep. 14, 2022

(87) PCT Pub. No.: WO2021/184149
PCT Pub. Date: Sep. 23, 2021

(65) Prior Publication Data
US 2023/0193028 A1    Jun. 22, 2023

(51) Int. Cl.
*C08L 83/04* (2006.01)
*C08K 3/22* (2006.01)

(52) U.S. Cl.
CPC ............ *C08L 83/04* (2013.01); *C08K 3/22* (2013.01); *C08K 2003/2227* (2013.01); *C08K 2201/001* (2013.01); *C08K 2201/005* (2013.01)

(58) Field of Classification Search
CPC ... C08L 83/04; C08K 3/22; C08K 2003/2227; C08K 2201/001; C08K 2201/005; C08K 5/56; C08G 77/12; C08G 77/20
See application file for complete search history.

(56) References Cited

U.S. PATENT DOCUMENTS

| | | |
|---|---|---|
| 2003/0049466 A1 | 3/2003 | Yamada et al. |
| 2010/0140538 A1 | 6/2010 | Sekiba |
| 2013/0248163 A1 | 9/2013 | Bhagwagar et al. |
| 2015/0097138 A1* | 4/2015 | Kato ............ C08K 5/56 252/75 |
| 2016/0009954 A1 | 1/2016 | Hanson |
| 2016/0096984 A1 | 4/2016 | Matsumoto |
| 2017/0158937 A1* | 6/2017 | Bhagwagar ........ F28F 23/00 |
| 2020/0239758 A1 | 7/2020 | Ota |

FOREIGN PATENT DOCUMENTS

| | | |
|---|---|---|
| CN | 101641412 A | 2/2010 |
| CN | 103298887 A | 9/2013 |
| CN | 104098914 A | 10/2014 |
| CN | 106349711 A | 1/2017 |
| CN | 109777118 A | 5/2019 |
| JP | 2007224102 A | 9/2007 |
| JP | 2011089079 A | 5/2011 |
| JP | 2011178821 A * | 9/2011 |
| JP | 2013071961 A | 4/2013 |
| JP | 2016011322 A | 1/2016 |
| JP | 2020002236 A | 1/2020 |
| WO | 2014098204 A1 | 6/2014 |
| WO | 2014181657 A1 | 11/2014 |
| WO | 2019021824 A1 | 1/2019 |

OTHER PUBLICATIONS

Ishihara, JP2011178821-MT (Year: 2011).*
Machine assisted English translation of JP2011178821A obtained from https://patents.google.com/patent on Mar. 26, 2024, 17 pages.
Machine assisted English translation of JP2016011322A obtained from https://patents.google.com/patent on Mar. 26, 2024, 19 pages.
Machine assisted English translation of JP2013071961A obtained from https://patents.google.com/patent on Mar. 26, 2024, 17 pages.
Machine assisted English translation of CN104098914A obtained from https://patents.google.com/patent on Feb. 20, 2023, 9 pages.
International Search Report for PCT/CN2020/079448 dated Nov. 10, 2020, 3 pages.
Machine assisted English translation of CN106349711A obtained from https://patents.google.com/patent on Dec. 4, 2022, 10 pages.
Machine assisted English translation of JP2020002236A obtained from https://patents.google.com/patent on Dec. 4, 2022, 9 pages.
Machine assisted English translation of JP2011089079A obtained from https://patents.google.com/patent on Dec. 4, 2022, 10 pages.
Machine assisted English translation of CN109777118A obtained from https://patents.google.com/patent on Dec. 4, 2022, 10 pages.

* cited by examiner

*Primary Examiner* — Robert S Jones, Jr.
*Assistant Examiner* — Zhen Liu
(74) *Attorney, Agent, or Firm* — Warner Norcross + Judd LLP

(57) ABSTRACT

A thermal conductive silicone composition is provided. The composition comprises: (A) an organopolysiloxane having at least two silicon atom-bonded alkenyl groups with 2 to 12 carbon atoms per molecule; (B) an organopolysiloxane having at least three silicon atom-bonded hydrogen atoms per molecule; (C) an organopolysiloxane having at most two silicon atom-bonded hydrogen atoms per molecule; (D) an aluminum hydroxide powder, such as a mixture of an aluminum hydroxide powder having an average particle size of at least 0.1 μm and less than 5 μm and an aluminum hydroxide powder having an average particle size of 5 μm to 50 μm; and (E) a hydrosilylation reaction catalyst. The composition cures to form a thermal conductive soft material. The material generally has little to no change in hardness even if the composition is cured after long-term storage.

14 Claims, No Drawings

THERMAL CONDUCTIVE SILICONE COMPOSITION

CROSS-REFERENCE TO RELATED APPLICATIONS

This application is the U.S. National Stage of, and claims priority to and all advantages of, International Application No. PCT/CN2020/079448 filed on 16 Mar. 2020, the content of which is incorporated herein by reference.

TECHNICAL FIELD

The present invention relates to a thermal conductive silicone composition.

BACKGROUND ART

Thermal conductive silicone compositions, which can be cured by a hydrosilylation reaction, form thermal conductive materials having excellent heat resistance, and are therefore used in a variety of applications.

For example, as such a thermally conductive silicone composition, Patent Document 1 describes a silicone elastomer composition comprising: an organopolysiloxane having in one molecule on average at least 0.1 alkenyl groups, an organopolysiloxane having in one molecule on average at least 2 silicon atom-bonded hydrogen atoms, a platinum group metal catalyst, a thermally conductive filler such as an aluminum hydroxide powder, an organosiloxane having in one molecule alkenyl groups and silicon atom-bonded alkoxy groups, and an alkoxysilane compound, wherein the composition is suitable for the production of an elastomer characterized by reduced change in hardness even after thermal ageing.

Patent Document 2 describes a thermally conductive silicone composition comprising: an organopolysiloxane having at least two alkenyl groups in a molecule, an organohydrogenpolysiloxane having at least two silicon atom-bonded hydrogen atoms, a thermally conductive filler comprising: 15-25 mass % of aluminum hydroxide having average particle size of ≥0.1 μm and <5 μm, 35-45 mass % of aluminum hydroxide having average particle size of ≥5 μm and <40 μm, and 35-45 mass % of aluminum hydroxide having average particle size of ≥40 μm and <100 μm, and a platinum group metal-based curing catalyst.

Patent Document 3 describes a polysiloxane composition comprising: an organoalkylpolysiloxane having in a molecule on average at least 0.1 alkenyl groups, a polyorganosiloxane having in a molecule on average at least 2 silicon atom-bonded hydrogen atoms, a hydrosilylation reaction catalyst, a thermally conductive filler such as an aluminum hydroxide powder, and an additive selected from the group consisting of metal-free and metal-containing phthalocyanine compounds.

Patent Document 4 describes a curable polymer composition for use as a pottant of a power converter, comprising: an organopolysiloxane having an average of at least 0.5 alkenyl group per molecule, an organopolysiloxane curing agent having at least two silicon atom-bonded hydrogen atoms per molecule, a hydrosilylation catalyst, a thermally conductive filler such as an aluminum hydroxide powder, and optionally further comprising a filler treating agent and a hydrosilylation stabilizer.

Recently thermal conductive soft materials with Shore 00 hardness of 10 to 70 have been evaluated in applications such as automobile, and electronics/electrics.

However, there is a problem that these thermal conductive silicone compositions form thermal conductive soft materials with change in hardness when the compositions are cured after a long-term storage.

PRIOR ART DOCUMENTS

Patent Documents

Patent Document 1: U.S. Patent Application Publication No. 2010/0140538 A1
Patent Document 2: Japanese Patent Application Publication No. 2011-089079 A
Patent Document 3: U.S. Patent Application Publication No. 2013/0248163 A1
Patent Document 4: U.S. Patent Application Publication No. 2016/0009954 A1

SUMMARY OF INVENTION

Technical Problem

An object of the present invention is to provide a thermal conductive silicone composition which forms a thermal conductive soft material with small change in hardness even if the composition is cured after a long-term storage.

Solution to Problem

The thermal conductive silicone composition of the present invention comprises:
(A) 100 parts by mass of an organopolysiloxane having at least two silicon atom-bonded alkenyl groups with 2 to 12 carbon atoms per molecule;
(B) an organopolysiloxane having at least three silicon atom-bonded hydrogen atoms per molecule and represented by the following general formula:

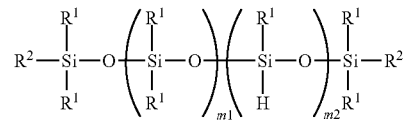

wherein each $R^1$ is independently a monovalent hydrocarbon group with 1 to 12 carbon atoms and free of an aliphatic unsaturated bond, each $R^2$ is independently selected from a hydrogen atom or $R^1$ as described above; and "m1" is an integer of 10 to 200, and "m2" is an integer of 1 to 50, in an amount such that a number of silicon atom-bonded hydrogen atoms in this component is from 0.01 to 0.5 moles per 1 mole of total alkenyl groups in component (A);
(C) an organopolysiloxane having at most two silicon atom-bonded hydrogen atoms per molecule and represented by the following general formula:

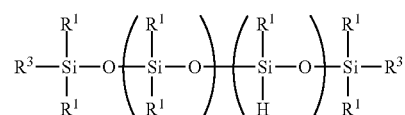

wherein R is as described above, each $R^3$ is independently selected from a hydrogen atom or or $R^1$ as described above; and "n1" is an integer of 5 to 50, and "n2" is an integer of 0 to 2 in an amount such that a number of silicon atom-bonded hydrogen atoms in this component is from 0.1 to 5 moles per 1 mole of total alkenyl groups in component (A);
(D) 200 to 2,500 parts by mass of an aluminum hydroxide powder; and
(E) a catalytic amount of a hydrosilylation reaction catalyst.

In various embodiments, component (D) comprises: (D-1) an aluminum hydroxide powder having an average particle size of at least 0.1 μm and less than 5 μm; and (D-2) an aluminum hydroxide powder having an average particle size of 5 μm to 50 μm, wherein an amount of component (D-1) is at most 50 mass % of component (D) and an amount of component (D-2) is more than 50 mass % of component (D).

In various embodiments, the thermal conductive silicone composition further comprises: (F) an alkoxysilane compound represented by the following general formula:

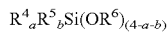

wherein each $R^4$ is independently an alkyl group with 6 to 15 carbon atoms, each $R^5$ is independently an alkyl group with 1 to 5 carbon atoms or an alkenyl groups with 2 to 6 carbon atoms, each $R^6$ is independently an alkyl group with 1 to 4 carbon atoms; and "a" is an integer of 1 to 3, "b" is an integer of 0 to 2, provided that "a+b" is an integer of 1 to 3, in an amount of 0.01 to 50 parts by mass per 100 parts by mass of component (A).

In various embodiments, the thermal conductive silicone composition further comprises: (G) a hydrosilylation reaction inhibitor, in an amount of 0.001 to 5 parts by mass per 100 parts by mass of component (A).

In various embodiments, the thermal conductive silicone composition further comprises: (H) a pigment, in an amount of 0.01 to 5 parts by mass per 100 parts by mass of component (A).

The thermal conductive material of the present invention characterized by being obtained by curing the thermal conductive silicone composition as described above.

Effects of Invention

The thermal conductive silicone composition of the present invention cures to form a thermal conductive soft material with small change in hardness even if the composition is cured after a long-term storage. While, the thermal conductive silicone material of the present invention exhibits expected softness.

Definitions

The terms "comprising" or "comprise" are used herein in their broadest sense to mean and encompass the notions of "including," "include," "consist(ing) essentially of," and "consist(ing) of." The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, the term "about" applies to both numerical values when associated with a range of values. Moreover, the term "about" may apply to numerical values even when not explicitly stated.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

DETAILED DESCRIPTION OF THE INVENTION

First, the thermal conductive silicone composition of the present invention will be explained in detail.

Component (A) is a primary component in the present composition and is an organopolysiloxane having at least two silicon atom-bonded alkenyl groups with from 2 to 12 carbon atoms per molecule. Examples of the alkenyl groups include vinyl groups, allyl groups, butenyl groups, pentenyl groups, hexenyl groups, heptenyl groups, octenyl groups, nonenyl groups, decenyl groups, undecenyl groups, and dodecenyl groups, among which vinyl groups are preferable. In addition, examples of groups bonding to silicon atoms other than the alkenyl groups in component (A) include alkyl groups having from 1 to 12 carbon atoms such as methyl groups, ethyl groups, propyl groups, isopropyl groups, butyl groups, isobutyl groups, tert-butyl groups, pentyl groups, neopentyl groups, hexyl groups, cyclohexyl groups, heptyl groups, octyl groups, nonyl groups, decyl groups, undecyl groups, and dodecyl groups; aryl groups having from 6 to 12 carbon atoms such as phenyl groups, tolyl groups, xylyl groups, and naphthyl groups; aralkyl groups having from 7 to 12 carbon atoms such as benzyl groups, phenethyl groups, and phenylpropyl groups; and groups in which some or all of the hydrogen atoms of these groups are substituted with halogen atoms such as fluorine atoms, chlorine atoms, or bromine atoms. Furthermore, the silicon atoms in component (A) may have small amounts of hydroxyl groups or alkoxy groups such as methoxy groups or ethoxy groups within a range that does not impair the object of the present invention.

Examples of molecular structure of component (A) include a straight-chain structure, a partially branched straight-chain structure, a branched-chain structure, a cyclic structure, and a three-dimensional reticular structure. Component (A) may be one type of organopolysiloxane having these molecular structures or may be a mixture of two or more types of organopolysiloxanes having these molecular structures.

Examples of component (A) include a dimethylpolysiloxane capped at both molecular terminals with trimethylsiloxy groups, a dimethylpolysiloxane capped at both molecular terminals with dimethylvinylsiloxy groups, a dimethylpolysiloxane capped at both molecular terminals with methylphenylvinylsiloxy groups, a copolymer of dimethylsiloxane and methylphenylsiloxane capped at both molecular terminals with trimethylsiloxy groups, a copolymer of dimethylsiloxane and methylphenylsiloxane capped at both molecular terminals with dimethylvinylsiloxy groups, a copolymer of dimethylsiloxane and methylvinylsiloxane capped at both molecular terminals with trimethylsiloxy groups, a copolymer of dimethylsiloxane and methylvinylsiloxane capped at both molecular terminals with dimethylvinylsiloxy groups, a methyl(3,3,3-trifluoropropyl) polysiloxane capped at both molecular terminals with dimethylvinylsiloxy groups, a copolymer of dimethylsiloxane and methylvinylsiloxane capped at both molecular terminals with silanol groups, a dimethylpolysiloxane capped at both molecular terminals with silanol groups, a copolymer of dimethylsiloxane and methylphenylsiloxane capped at both molecular terminals with silanol groups, an organopolysiloxane consisting of a siloxane unit represented by the formula: $CH_3SiO_{3/2}$ and a siloxane unit represented by the formula: $(CH_3)_2SiO_{2/2}$, an organopolysiloxane consisting of a siloxane unit represented by the formula: $C_6H_5SiO_{3/2}$ and a siloxane unit represented by the formula: $(CH_3)_2SiO_{2/2}$, an organopolysiloxane consisting of a siloxane unit represented by the formula: $(CH_3)_3SiO_{1/2}$, a siloxane unit represented by the formula: $CH_3SiO_{3/2}$, and a siloxane unit represented by the formula: $(CH_3)_2SiO_{2/2}$, an organopolysiloxane consisting of a siloxane unit represented by the formula: $(CH_3)_3SiO_{1/2}$, a siloxane unit represented by the formula: $(CH_3)_2(CH_2=CH)SiO_{1/2}$, a siloxane unit represented by the formula $CH_3SiO_{3/2}$, and a siloxane unit represented by the formula: $(CH_3)_2SiO_{2/2}$; and combinations of two or more thereof.

Additionally, a viscosity at 25° C. of component (A) is in a range of from about 10 to about 100,000 mPa·s, preferably in a range from 10 to 50,000 mPa·s, alternatively in a range from 10 to 10,000 mPa·s, and alternatively in a range from 50 to 10,000 mPa·s. This is because when the viscosity of component (A) is greater than or equal to the lower limit of the aforementioned range, mechanical properties of a thermal conductive material obtained by curing the silicone composition is improved, and when the viscosity of component (A) is less than or equal to the upper limit of the aforementioned range, handling of the present composition is improved.

Component (B) is a crosslinking agent for component (A) in the present composition and is an organopolysiloxane having at least three silicon atom-bonded hydrogen atoms per molecule. The organopolysiloxane for component (B) is represented by the following general formula:

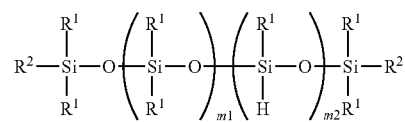

In the formula, each R is independently a monovalent hydrocarbon group with 1 to 12 carbon atoms and free of an aliphatic unsaturated bond. Examples of the monovalent hydrocarbon groups include alkyl groups having from 1 to 12 carbon atoms such as methyl groups, ethyl groups, propyl groups, isopropyl groups, butyl groups, isobutyl groups, tert-butyl groups, pentyl groups, neopentyl groups, hexyl groups, cyclohexyl groups, heptyl groups, octyl groups, nonyl groups, decyl groups, undecyl groups, and dodecyl groups; aryl groups having from 6 to 12 carbon atoms such as phenyl groups, tolyl groups, xylyl groups, and naphthyl groups; aralkyl groups having from 7 to 12 carbon atoms such as benzyl groups, phenethyl groups, and phenylpropyl groups; and groups in which some or all of the hydrogen atoms of these groups are substituted with halogen atoms such as fluorine atoms, chlorine atoms, or bromine atoms. Furthermore, the silicon atoms in component (B) may have small amounts of hydroxyl groups or alkoxy groups such as methoxy groups or ethoxy groups within a range that does not impair the object of the present invention.

In the formula, each $R^2$ is independently selected from a hydrogen atom or R as described above.

In the formula, "m1" is an integer of 10 to 200, optionally an integer of 50 to 200, or optionally an integer of 50 to 150. This is because, when "m1" is equal to or greater than the lower limit of the range described above, the molecular weight of the organosilicon compound can be increased, and volatility of the organosilicon compound can be reduced. On the other hand, when "m1" is equal to or less than the upper limit of the range described above, handling property of the thermal conductive silicone composition can be enhanced.

In the formula, "m2" is an integer of 1 to 50, optionally an integer of 3 to 30, or optionally an integer of 5 to 20. This is because, when "m2" is equal to or greater than the lower limit of the range described above, the molecular weight of the organosilicon compound can be increased, and volatility of the organosilicon compound can be reduced. On the other hand, when "m2" is equal to or less than the upper limit of the range described above, curability of the thermal conductive silicone composition can be enhanced. When "m2" is 1, both $R^2$s are hydrogen atoms, and when "m2" is 2, at least one $R^2$ is a hydrogen atom.

A content of component (B) is in an amount such that a number of silicon atom-bonded hydrogen atoms in this component is from 0.01 to 0.5 moles, optionally from 0.01 to 0.3 moles, or optionally 0.01 to 0.2 moles, per 1 mole of total alkenyl groups in component (A). This is because, when the content of component (B) is equal to or greater than the lower limit of the range described above, the resulting composition is cured sufficiently. On the other hand, when the content of component (B) is equal to or less than the upper limit of the range described above, heat resistance of the resulting thermal conductive material is enhanced.

Component (C) is a chain extending agent for component (A) in the present composition and is an organopolysiloxane having at most two silicon atom-bonded hydrogen atoms per molecule. The organopolysiloxane form component (C) is represented by the following general formula:

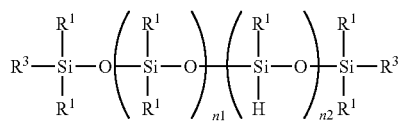

In the formula, each $R^1$ is as described above.

In the formula, each $R^3$ is independently selected from a hydrogen atom or $R^1$ as described above.

In the formula, "n1" is an integer of 5 to 50, optionally an integer of 5 to 30, or optionally an integer of 10 to 30. This is because, when "n1" is equal to or greater than the lower limit of the range described above, the molecular weight of the organosilicon compound can be increased, and volatility of the organosilicon compound can be reduced. On the other hand, when "n1" is equal to or less than the upper limit of the range described above, handling property of the thermal conductive silicone composition can be enhanced.

In the formula, "n2" is an integer of 0 to 2. This is because, when "n2" is equal to or greater than the lower limit of the range described above, the molecular weight of the organosilicon compound can be increased, and volatility of the organosilicon compound can be reduced. On the other hand, when "n2" is equal to or less than the upper limit of the range described above, modulus of a thermal conductive material obtained by curing the thermal conductive silicone composition can be enhanced. When "n2" is 0, both $R^2$s are hydrogen atoms, and when "n2" is 2, one $R^2$ is a hydrogen atom.

A content of component (C) is in an amount such that a number of silicon atom-bonded hydrogen atoms in this component is from 0.1 to 5 moles, optionally from 0.1 to 3 moles, or optionally 0.1 to 2 moles, per 1 mole of total alkenyl groups in component (A). This is because, when the content of component (C) is equal to or greater than the lower limit of the range described above, the resulting composition is cured sufficiently. On the other hand, when the content of component (C) is equal to or less than the upper limit of the range described above, heat resistance of the resulting thermal conductive material is enhanced.

Component (D) is an aluminum hydroxide powder as a thermal conductive filler to provide the present composition with thixotropic property. Component (D) preferably comprises: (D-1) an aluminum hydroxide powder having an average particle size of at least 0.1 μm and less than 5 μm; and (D-2) an aluminum hydroxide powder having an average particle size of 5 μm to 50 μm.

A content of component (D-1) is not limited, but it is preferably in an amount of at most 50 mass %, alternatively in an amount of at most 40 mass % of component (D). On the other hand, a content of component (D-2) is not limited, but it is preferably in an amount of more than 50 mass %, alternatively in an amount of more than 60 mass % of component (D). This is because, when the content of component (D-1) is equal to or less than the upper limit of the range described above, thermal conductive property of the resulting thermal conductive material is enhanced. On the other hand, when the content of component (D-2) is equal to or greater than the lower limit of the range described above, thixotropic property of the composition is enhanced.

A content of component (D) is in a range of from about 200 to about 2,500 parts by mass, optionally in a range of from about 300 to about 2,000 parts by mass, or optionally in a range of from about 300 to about 1,500 parts by mass, relative to 100 parts by mass of component (A). This is because when the content of component (D) is equal to or greater than the lower limit of the range described above, thermal conductive property of the composition is improved, and when the content of component (D) is equal to or less than the upper limit of the range described above, handling of the composition is improved.

Component (E) is a hydrosilylation catalyst to accelerate curing of the present composition. Examples of component (E) include platinum group element catalysts and platinum group element compound catalysts, and specific examples include platinum-based catalysts, rhodium-based catalysts, palladium-based catalysts, and combinations of at least two types thereof. In particular, platinum-based catalysts are preferable in that the curing of the present composition can be dramatically accelerated. Examples of these platinum-based catalysts include finely powdered platinum; platinum black; chloroplatinic acid, alcohol-modified chloroplatinic acid; chloroplatinic acid/diolefin complexes; platinum/olefin complexes; platinum/carbonyl complexes such as platinum bis(acetoacetate), and platinum bis(acetylacetonate); chloroplatinic acid/alkenylsiloxane complexes such as chloroplatinic acid/divinyltetramethyl disiloxane complexes, and chloroplatinic acid/tetravinyl tetramethyl cyclotetrasiloxane complexes; platinum/alkenylsiloxane complexes such as platinum/divinyltetramethyl disiloxane complexes, and platinum/tetravinyl tetramethyl cyclotetrasiloxane complexes; complexes of chloroplatinic acid and acetylene alcohols; and mixtures of two or more types thereof. In particular, platinum-alkenylsiloxane complexes are preferable in that the curing of the present composition can be accelerated.

Examples of the alkenylsiloxane used in the platinum-alkenylsiloxane complex include 1,3-divinyl-1,1,3,3-tetramethyldisiloxane, 1,3,5,7-tetramethyl-1,3,5,7-tetravinylcyclotetrasiloxane, alkenylsiloxane oligomers in which some of methyl groups of these alkenylsiloxanes are substituted with ethyl groups, phenyl groups, or the like, and alkenylsiloxane oligomers in which vinyl groups of these alkenylsiloxanes are substituted with allyl groups, hexenyl groups, or the like. In particular, 1,3-divinyl-1,1,3,3-tetramethyldisiloxane is preferable in that the stability of the platinum-alkenylsiloxane complex that is produced is good.

In order to improve the stability of the platinum-alkenylsiloxane complexes, it is preferable to dissolve these platinum-alkenylsiloxane complexes in an alkenylsiloxane oligomer such as 1,3-divinyl-1,1,3,3-tetramethyldisiloxane, 1,3-diallyl-1,1,3,3-tetramethyldisiloxane, 1,3-divinyl-1,3-dimethyl-1,3-diphenyldisiloxane, 1,3-divinyl-1,1,3,3-tetraphenyldisiloxane, or 1,3,5,7-tetramethyl-1,3,5,7-tetravinylcyclotetrasiloxane or an organosiloxane oligomer such as a dimethylsiloxane oligomer, and it is particularly preferable to dissolve the complexes in an alkenylsiloxane oligomer.

A content of component (E) is catalytic amount to accelerate the curing of the present composition, but it is preferably in an amount of from about 0.01 to about 1,000 ppm of the platinum group metal in this component in terms of mass units with respect to this composition. Specifically, the content is preferably an amount such that the content of platinum group metal in component (E) is in the range of from about 0.01 to about 500 ppm, alternatively in the range of from about 0.1 to about 100 ppm in terms of mass units with respect to the present composition. This is because when the content of component (E) is equal to or greater than the lower limit of the range described above, curability of the composition is good, whereas when the content of component (E) is equal to or less than the upper limit of the range described above, coloration of the thermal conductive material is suppressed.

The composition may comprise (F) an alkoxysilane compound in order to employ large amount of component (C). Component (F) is an alkoxysilane represented by the following general formula:

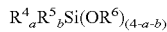

$$R^4_a R^5_b Si(OR^6)_{(4-a-b)}$$

In the formula, $R^4$ is independently an alkyl group with 6 to 15 carbon atoms. Examples of the alkyl groups include hexyl groups, heptyl groups, octyl groups, nonyl groups, decyl groups, undecyl groups, and dodecyl groups.

In the formula, $R^5$ is independently an alkyl group with 1 to 5 carbon atoms or an alkenyl groups with 2 to 6 carbon atoms. Examples of the alkyl groups include methyl groups, ethyl groups, propyl groups, isopropyl groups, butyl groups, isobutyl groups, tert-butyl groups, pentyl groups, and neopentyl groups. Examples of the alkenyl groups include vinyl group, ally group, butenyl groups, pentenyl groups and hexenyl groups.

In the formula, $R^6$ is independently an alkyl group with 1 to 4 carbon atoms. Examples of the alkyl groups include methyl groups, ethyl groups, propyl groups, isopropyl groups, butyl groups, isobutyl groups, and tert-butyl groups.

In the formula, "a" is an integer of 1 to 3, "b" is an integer of 0 to 2, provided that "a+b" is an integer of 1 to 3, alternatively "a" is 1, "b" is an integer of 0 or 1, or alternatively "a" is 1, "b" is 0.

Examples of alkoxysilanes for component (F) include hexyl trimethoxysilane, heptyl trimethoxysilane, octyl triethoxysilane, decyl trimethoxysilane, dodecyl trimethoxysilane, dodecyl methyl dimethoxysilane, dodecyl triethoxysilane, tetradecyl trimethoxysilane, octadecyl trimethoxysilane, octadecyl methyl dimethoxysilane, octadecyl triethoxysilane, nonadecyl trimethoxysilane, or any combination of at least two thereof.

A content of component (F) is not limited, but it is preferably in an amount of 0.01 to 50 parts by mass, alternatively in an amount of 0.01 to 20 parts by mass, or alternatively in an amount of 0.1 to 10 parts by mass, per 100 parts by mass of component (A). This is because when the content of component (F) is equal to or greater than the lower limit of the range described above, storage stability of the present composition is good, whereas when the content of component (F) is equal to or less than the upper limit of the range described above, curability of the present composition at low temperatures is good.

The composition may comprise (G) a hydrosilylation reaction inhibitor in order to prolong the usable time at ambient temperature and to improve storage stability. Examples of component (G) include acetylenic alcohols such as 1-ethynyl-cyclohexan-1-ol, 2-methyl-3-butyn-2-ol, 2-phenyl-3-butyn-2-ol, 2-ethynyl-isopropan-2-ol, 2-ethynyl-butan-2-ol, and 3,5-dimethyl-1-hexyn-3-ol; silylated acetylenic alcohols such as trimethyl (3,5-dimethyl-1-hexyn-3-oxy) silane, dimethyl bis(3-methyl-1-butyn-oxy) silane, methylvinyl bis(3-methyl-1-butyn-3-oxy) silane, and ((1,1-dimethyl-2-propynyl)oxy)trimethylsilane; unsaturated carboxylic esters such as diallyl maleate, dimethyl maleate, diethyl fumarate, diallyl fumarate, and bis(2-methoxy-1-methylethyl) maleate, mono-octylmaleate, mono-isooctyl-maleate, mono-allyl maleate, mono-methyl maleate, mono-ethyl fumarate, mono-allyl fumarate, and 2-methoxy-1-methylethylmaleate; ene-yne compounds such as 2-isobutyl-1-buten-3-yne, 3,5-dimethyl-3-hexen-1-yne, 3-methyl-3-penten-1-yne, 3-methyl-3-hexen-1-yne, 1-ethynyl cyclohexene, 3-ethyl-3-buten-1-yne, and 3-phenyl-3-buten-1-yne; and mixtures of two or more types thereof.

A content of component (G) is in an amount of from about 0.001 to 5 parts by mass, optionally in an amount of from about 0.001 to about 2 parts by mass, or optionally in an amount of from about 0.001 to about 1 parts by mass, per 100 parts by mass of component (A). This is because when the content of component (G) is equal to or greater than the lower limit of the range described above, handing of the present composition is good, whereas when the content of component (G) is equal to or less than the upper limit of the range described above, curability of the present composition at low temperatures is good.

The composition may comprise (H) a pigment that has an effect of preserving the desired physical characteristic of the thermally conductive silicone materials, namely the appropriate softness and compliant nature. Examples of component (H) include iron oxide red, titanium white, carbon black, and phthalocyanine compound. Among these, the phthalocyanine compound is preferably. Examples of the phthalocyanine compounds include copper phthalocyanine, and chlorinated copper phthalocyanine. Phthalocyanine compounds are available commercially, such as Stan-tone™ 40SP03 from PolyOne Corporation, Avon Lake, Ohio, USA.

A content of component (H) is not limited, but it is preferably in an amount such that in terms of mass units the pigment is in a range of 0.01 to 5 parts by mass, alternatively in a range of 0.05 to 5 parts by mass, or alternatively in a range of 0.05 to 1 parts by mass, per 100 parts by mass of component (A).

The composition may comprise a reinforcing and/or non-reinforcing filler. Examples of the fillers include one or more of finely divided treated or untreated precipitated or fumed silica; precipitated or ground calcium carbonate, zinc carbonate; clays such as finely divided kaolin; quartz powder; zirconium silicate; diatomaceous earth; wollastonite; pyrophylate; and metal oxides such as fumed or precipitated titanium dioxide, cerium oxide, magnesium oxide powder, zinc oxide, and iron oxide. These may also include glass fiber; talc; aluminite; calcium sulphate (anhydrite); gypsum; calcium sulphate; magnesium carbonate; magnesium hydroxide (brucite); graphite; barite, a form of barium sulphate; copper carbonate, e.g., malachite; nickel carbonate, e.g., zarachite; barium carbonate, e.g., witherite; strontium carbonate e.g., strontianite, or a similar inorganic filler.

The thermal conductive silicone compositions of this invention can be prepared by combining all of ingredients at ambient temperature. Any of the mixing techniques and devices described in the prior art can be used for this purpose. The particular device used will be determined by the viscosity of the ingredients and the final composition. Cooling of the ingredients during mixing may be desirable to avoid premature curing.

Next, the thermal conductive material of the present invention will be explained in detail.

The thermal conductive material of the present invention is characterized by being obtained by curing the thermal conductive silicone composition as described above. Hardness of the thermal conductive material is not limited, but it is preferably in a range of 10 to 70, alternatively in a range of 10 to 75, in Shore 00 Hardness. This is because when the thermal conductive material has hardness within the range described above, good flexibility against heat generating material. Note that in the present specification, Shore 00 Hardness is the value measured using a type 00 hardness according to ASTM D 2240 at 23±2° C.

EXAMPLES

The thermal conductive silicone composition of the present invention will be described in detail hereinafter using Practical Examples and Comparative Examples. However, the present invention is not limited by the description of the below listed Practical Examples.

<Viscosity>
Viscosity at 23±2° C. was measured by using a type B viscometer (Brookfield HA Type Rotational Viscometer) at 1 $s^{-1}$ and 10 $s^{-1}$ according to ASTM D 1084 "Standard Test Methods for Viscosity of Adhesive".

<Thixotropic Index>
Thixotropic index was calculated as a ratio of the viscosity at 25±2° C. measured at 1 $s^{-1}$ with respect to the viscosity at 25±2° C. measured at 10 $s^{-1}$.

<Shore OO Hardness>
Thermal conductive materials were obtained by heat curing the thermal conductive silicone compositions for 1 hour at 120° C. in an air circulating oven. The thermal conductive materials were stacked to be at least 6 mm in thickness for durometer measurement. The hardness of the thermal conductive material at 25° C. was measured by a type 00 hardness according to the method specified by ASTM D 2240-00.

Practical Examples 1-3 and Comparative Examples 1-2

Thermal conductive silicone compositions shown in Table 1 were prepared using the components mentioned below. Moreover, in Table 1, "SiH/Vi (1)" represents moles of silicon atom-bonded hydrogen atoms in component (B) per 1 mole of vinyl groups in components (A), and "SiH/Vi (2)" represents moles of silicon atom-bonded hydrogen atoms in component (C) per 1 mole of vinyl groups in components (A).

The following component was used as component (A).
Component (a-1): a dimethylpolysiloxane having a viscosity of about 450 mPa·s and endblocked at both molecular chain terminals with dimethylvinylsiloxy groups.

The following component was used as component (B).
Component (b-1): an organopolysiloxane having a viscosity of 150 mPa·s and represented by the following formula:

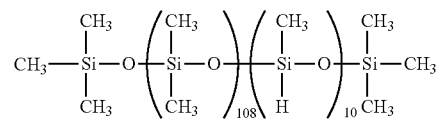

The following component was used as component (C).
Component (c-1): an organopolysiloxane having a viscosity of 20 mPa·s and represented by the following formula:

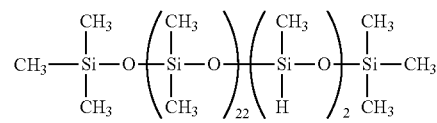

The following components were used as component (D).
Component (d-1): an aluminum hydroxide powder having an average particle diameter of about 1 μm.
Component (d-2): an aluminum hydroxide powder having an average particle diameter of about 25 μm.

The following component was used as component (E).
Component (e-1): a catalyst master batch of a platinum complex with 1,3-divinyl-1,1,3,3-tetramethyldisiloxane and component (a-1) as described above (platinum content=0.1 mass %).

The following component was used as component (F).
Component (f-1): n-decyl trimethoxysilane The following component was used as component (G).
Component (g-1): a hydrosilylation reaction inhibitor master batch of 0.5 mass % of 2-phenyl-3-butyn-2-ol and 99.5 mass % of component (a-1) as described above.

The following component was used as component (H).
Component (h-1): a pigment master batch of 40 mass % of copper phthalocyanine and 60 mass % of component (a-1) as described above.

TABLE 1

| Category | | Practical Examples | | | Comparative Examples | |
|---|---|---|---|---|---|---|
| Item | | 1 | 2 | 3 | 1 | 2 |
| Thermal conductive silicone composition (parts by mass) | (a-1) | 29.05 | 29.05 | 29.05 | 29.05 | 29.15 |
| | (b-1) | 0.10 | 0.20 | 0.30 | 0 | 2.50 |
| | (c-1) | 2.50 | 2.40 | 2.30 | 2.60 | 0 |
| | (d-1) | 50.90 | 50.90 | 50.90 | 50.90 | 50.90 |
| | (d-2) | 115.80 | 115.80 | 115.80 | 115.80 | 115.80 |
| | (e-1) | 0.15 | 0.15 | 0.15 | 0.15 | 0.15 |
| | (f-1) | 1.00 | 1.00 | 1.00 | 1.00 | 1.00 |
| | (g-1) | 0.30 | 0.30 | 0.30 | 0.30 | 0.30 |
| | (h-1) | 0.20 | 0.20 | 0.20 | 0.20 | 0.20 |
| SiH/Vi ratio (1) | | 0.03 | 0.05 | 0.08 | 0 | 0.66 |
| SiH/Vi ratio (2) | | 0.60 | 0.58 | 0.56 | 0.63 | 0 |
| Initial | Viscosity at 1 $s^{-1}$ (mPa·s) | 440 | 441 | 460 | 452 | 519 |
| | Viscosity at 10 $s^{-1}$ (mPa·s) | 112 | 114 | 118 | 115 | 140 |

TABLE 1-continued

| Category | | Practical Examples | | | Comparative Examples | |
|---|---|---|---|---|---|---|
| Item | | 1 | 2 | 3 | 1 | 2 |
| | Thixotropic index | 3.9 | 3.9 | 3.9 | 3.9 | 3.7 |
| | Shore OO Hardness | 55 | 60 | 63 | 50 | 80 |
| After aging 50° C. for 1 month | Viscosity at 1 s⁻¹ (mPa · s) | 577 | 551 | 533 | 546 | 607 |
| | Viscosity at 10 s⁻¹ (mPa · s) | 150 | 143 | 138 | 134 | 177 |
| | Thixotropic index | 3.8 | 3.9 | 3.9 | 4.1 | 3.4 |
| | Shore OO Hardness | 15 | 30 | 45 | 10 | 80 |

INDUSTRIAL APPLICABILITY

The thermal conductive silicone composition of the present invention exhibits excellent stability of thixotropic property during a long-term storage, and cures to form a thermal conductive soft material with small change in hardness even if the composition is cured after a long-term storage. Therefore, the thermal conductive silicone composition is useful, in thermal conductive materials for an electric/electronic apparatus.

The invention claimed is:

1. A thermal conductive silicone composition comprising:
(A) 100 parts by mass of an organopolysiloxane having at least two silicon atom-bonded alkenyl groups with 2 to 12 carbon atoms per molecule;
(B) an organopolysiloxane having at least three silicon atom-bonded hydrogen atoms per molecule and represented by the following general formula:

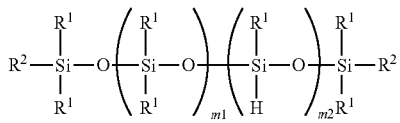

wherein each $R^1$ is independently a monovalent hydrocarbon group with 1 to 12 carbon atoms and free of an aliphatic unsaturated bond, each $R^2$ is independently selected from a hydrogen atom or $R^1$ as described above; and "m1" is an integer of 10 to 200, and "m2" is an integer of 3 to 50, in an amount such that a number of silicon atom-bonded hydrogen atoms in this component is from 0.01 to 0.5 moles per 1 mole of total alkenyl groups in component (A);
(C) an organopolysiloxane having two silicon atom-bonded hydrogen atoms per molecule and represented by the following general formula:

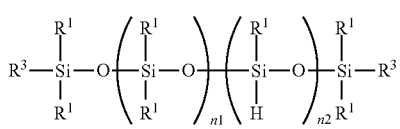

wherein $R^1$ is as described above, each $R^3$ is independently selected from $R^1$ as described above; and "n1" is an integer of 5 to 50, and "n2" is an integer of 2, in an amount such that a number of silicon atom-bonded hydrogen atoms in this component is from 0.1 to 5 moles per 1 mole of total alkenyl groups in component (A);
(D) 200 to 2,500 parts by mass of an aluminum hydroxide powder; and
(E) a catalytic amount of a hydrosilylation reaction catalyst.

2. The thermal conductive silicone composition according to claim 1, wherein component (D) comprises:
(D-1) an aluminum hydroxide powder having an average particle size of at least 0.1 μm and less than 5 μm; and
(D-2) an aluminum hydroxide powder having an average particle size of 5 μm to 50 μm;
wherein an amount of component (D-1) is at most 50 mass % of component (D) and an amount of component (D-2) is more than 50 mass % of component (D).

3. The thermal conductive silicone composition according to claim 1, further comprising:
(F) an alkoxysilane compound represented by the following general formula:

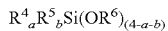

wherein each $R^4$ is independently an alkyl group with 6 to 15 carbon atoms, each $R^5$ is independently an alkyl group with 1 to 5 carbon atoms or an alkenyl groups with 2 to 6 carbon atoms, each $R^6$ is independently an alkyl group with 1 to 4 carbon atoms; and "a" is an integer of 1 to 3, "b" is an integer of 0 to 2, provided that "a+b" is an integer of 1 to 3, in an amount of 0.01 to 50 parts by mass per 100 parts by mass of component (A).

4. The thermal conductive silicone composition according to claim 1, further comprising:
(G) a hydrosilylation reaction inhibitor, in an amount of 0.001 to 5 parts by mass per 100 parts by mass of component (A).

5. The thermal conductive silicone composition according to claim 1, further comprising:
(H) a pigment, in an amount of 0.01 to 5 parts by mass per 100 parts by mass of component (A).

6. A thermal conductive material obtained by curing the thermal conductive silicone composition of claim 1.

7. The thermal conductive silicone composition according to claim 3, further comprising:
(G) a hydrosilylation reaction inhibitor, in an amount of 0.001 to 5 parts by mass per 100 parts by mass of component (A).

8. The thermal conductive silicone composition according to claim 7, further comprising:
(H) a pigment, in an amount of 0.01 to 5 parts by mass per 100 parts by mass of component (A).

9. The thermal conductive silicone composition according to claim 2, further comprising:
(F) an alkoxysilane compound represented by the following general formula:

$$R^4_a R^5_b Si(OR^6)_{(4-a-b)} \quad \quad 5$$

wherein each $R^4$ is independently an alkyl group with 6 to 15 carbon atoms, each $R^5$ is independently an alkyl group with 1 to 5 carbon atoms or an alkenyl groups with 2 to 6 carbon atoms, each $R^6$ is independently an alkyl group with 1 to 4 carbon atoms; and "a" is an integer of 1 to 3, "b" is an integer of 0 to 2, provided that "a+b" is an integer of 1 to 3, in an amount of 0.01 to 50 parts by mass per 100 parts by mass of component (A).

10. The thermal conductive silicone composition according to claim 2, further comprising:
(G) a hydrosilylation reaction inhibitor, in an amount of 0.001 to 5 parts by mass per 100 parts by mass of component (A).

11. The thermal conductive silicone composition according to claim 2, further comprising:
(H) a pigment, in an amount of 0.01 to 5 parts by mass per 100 parts by mass of component (A).

12. The thermal conductive silicone composition according to claim 1, wherein components (B) and (C) are present in a mass ratio of from 1:25 to 1:7.

13. A thermal conductive silicone composition comprising:
(A) 100 parts by mass of an organopolysiloxane having at least two silicon atom-bonded alkenyl groups with 2 to 12 carbon atoms per molecule;
(B) an organopolysiloxane having at least three silicon atom-bonded hydrogen atoms per molecule and represented by the following general formula:

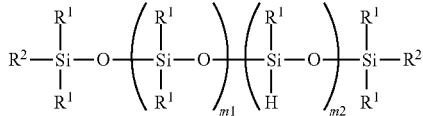

wherein each $R^1$ is independently a monovalent hydrocarbon group with 1 to 12 carbon atoms and free of an aliphatic unsaturated bond, each $R^2$ is independently selected from a hydrogen atom or $R^1$ as described above; and "m1" is an integer of 10 to 200, and "m2" is an integer of 5 to 20, in an amount such that a number of silicon atom-bonded hydrogen atoms in this component is from 0.01 to 0.5 moles per 1 mole of total alkenyl groups in component (A);

(C) an organopolysiloxane having two silicon atom-bonded hydrogen atoms per molecule and represented by the following general formula:

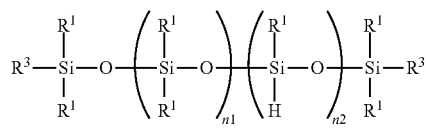

wherein $R^1$ is as described above, each $R^3$ is independently selected from $R^1$ as described above; and "n1" is an integer of 5 to 50, and "n2" is an integer of 2, in an amount such that a number of silicon atom-bonded hydrogen atoms in this component is from 0.1 to 5 moles per molecule of total alkenyl groups in component (A);

(D) 200 to 2,500 parts by mass of an aluminum hydroxide powder; and (E) a catalytic amount of a hydrosilylation reaction catalyst.

14. The thermal conductive silicone composition according to claim 13, wherein components (B) and (C) are present in a mass ratio of from 1:25 to 1:7.

* * * * *